United States Patent
Lee

(10) Patent No.: US 10,754,383 B2
(45) Date of Patent: Aug. 25, 2020

(54) IMAGE PROCESSING METHOD AND ELECTRONIC DEVICE SUPPORTING SAME

(71) Applicant: Samsung Electronics Co., Ltd., Gyeonggi-do (KR)

(72) Inventor: Hwa Jun Lee, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/088,906

(22) PCT Filed: Apr. 10, 2017

(86) PCT No.: PCT/KR2017/003878
§ 371 (c)(1),
(2) Date: Sep. 27, 2018

(87) PCT Pub. No.: WO2017/179872
PCT Pub. Date: Oct. 19, 2017

(65) Prior Publication Data
US 2019/0121395 A1    Apr. 25, 2019

(30) Foreign Application Priority Data

Apr. 12, 2016 (KR) .......................... 10-2016-0044513

(51) Int. Cl.
*G06F 1/16* (2006.01)
*G06F 3/0485* (2013.01)
(Continued)

(52) U.S. Cl.
CPC .......... *G06F 1/1643* (2013.01); *G06F 1/1626* (2013.01); *G06F 1/1647* (2013.01);
(Continued)

(58) Field of Classification Search
CPC .... G06F 1/1643; G06F 1/1626; G06F 3/0485; G06F 3/0482; G06F 1/1647; H04N 5/23229; H04N 1/00641
See application file for complete search history.

(56) References Cited

U.S. PATENT DOCUMENTS 8,219,152 B2    7/2012    Oh et al.
9,152,301 B2    10/2015   Akifusa et al.
(Continued)

FOREIGN PATENT DOCUMENTS

JP    2006-18020 A    1/2006
JP    4366487 B2      11/2009
(Continued)

OTHER PUBLICATIONS

European Search Report dated Feb. 20, 2019.

*Primary Examiner* — Aneeta Yodichkas
(74) *Attorney, Agent, or Firm* — Cha & Reiter, LLC

(57) ABSTRACT

An electronic device includes a plurality of displays, a memory storing at least one image, and a processor operatively connected to the displays and the memory. The processor is configured to output a first image of images stored in the memory, on a first display among the displays, to output a multimedia image on a second display among the displays, and to assign a display order of the second image so as to be adjacent to a display order of the first image, when a second image is obtained.

21 Claims, 7 Drawing Sheets

(51) Int. Cl.
　　　*G06F 3/0482*　　　(2013.01)
　　　*H04N 5/232*　　　(2006.01)
(52) U.S. Cl.
　　　CPC .......... *G06F 3/0482* (2013.01); *G06F 3/0485* (2013.01); *H04N 5/23229* (2013.01)

(56) References Cited

U.S. PATENT DOCUMENTS

| | | |
|---|---|---|
| 9,818,196 B2 | 11/2017 | Zhou et al. |
| 2002/0064387 A1* | 5/2002 | Miyake .................. G03B 17/48 396/429 |
| 2007/0035616 A1* | 2/2007 | Lee .................... H04N 1/00307 348/14.16 |
| 2010/0056220 A1 | 3/2010 | Oh et al. |
| 2010/0321527 A1 | 12/2010 | van Schalkwyk |
| 2012/0075294 A1 | 3/2012 | Akifusa et al. |
| 2014/0101577 A1* | 4/2014 | Kwak .................. G06F 1/1647 715/761 |
| 2015/0279040 A1 | 10/2015 | Zhou et al. |
| 2015/0317120 A1 | 11/2015 | Kim et al. |

FOREIGN PATENT DOCUMENTS

| | | |
|---|---|---|
| KR | 10-2010-0027866 A | 3/2010 |
| KR | 10-2015-0126193 A | 11/2015 |

\* cited by examiner

IMAGE PROCESSING METHOD AND ELECTRONIC DEVICE SUPPORTING SAME

TECHNICAL FIELD

The present disclosure relates to a technology for processing an image.

BACKGROUND ART

In recent years, an electronic device including a plurality of displays has been widely distributed. The electronic device including the plurality of displays allows each of the displays to output different screens (or images). For example, the electronic device may output execution screens of different applications on the displays, respectively; or the electronic device may output different function execution screens of the same application on the displays, respectively. For example, the electronic device may output the execution screen of an album application on a first display and may output the execution screen of a camera application on a second display.

The electronic device may output images stored in a memory, on at least one display. For example, the electronic device may output the execution screen of the album application, which makes it possible to output images stored in the memory, on at least one display. In addition, the electronic device may obtain an image from a camera module or may obtain an image from an external electronic device connected through wireless/wired communication.

DETAILED DESCRIPTION OF THE INVENTION

Technical Problem

When a conventional electronic device obtains an image from a camera module or an external electronic device while outputting images stored in a memory, the conventional electronic device may change the output image to the obtained image and output the obtained image. For example, the electronic device may assign the display order of the obtained image to the first order and may output an image of the first order. In this case, since the display order of an image output in advance is not adjacent to the first order, there is no choice but to perform various steps for the purpose of outputting the output image again.

Technical Solution

To solve the above-mentioned problems and tasks issued in this disclosure, embodiments disclosed in the present disclosure may provide an image processing method for assigning the display order of the obtained image so as to be adjacent to the display order of an image, which is output in advance, and an electronic device supporting the same.

According to an embodiment of the present disclosure, an electronic device may include a plurality of displays, a memory storing at least one image, and a processor operatively connected to the displays and the memory. The processor may be configured to output a first image of images stored in the memory, on a first display among the displays, to output a multimedia image on a second display among the displays, and to assign a display order of a second image so as to be adjacent to a display order of the first image, when the second image is obtained.

In addition, According to an embodiment of the present disclosure, an image processing method of an electronic device including a plurality of displays may include outputting a first image of images stored in a memory, on a first display, outputting a multimedia image on a second display, obtaining a second image, and assigning a display order of the second image so as to be adjacent to a display order of the first image.

Other aspects, advantages, and salient features of the disclosure will become apparent to those skilled in the art from the following detailed description, which, taken in conjunction with the annexed drawings, discloses various embodiments of the present disclosure.

Advantageous Effects of the Invention

According to various embodiments of the present disclosure, the display order of the obtained image may be assigned to be adjacent to the display order of an output image, which is output in advance, and thus it is possible to quickly output the output image again.

Besides, a variety of effects directly or indirectly understood through this disclosure may be provided.

BEST MODE

Figure 1:
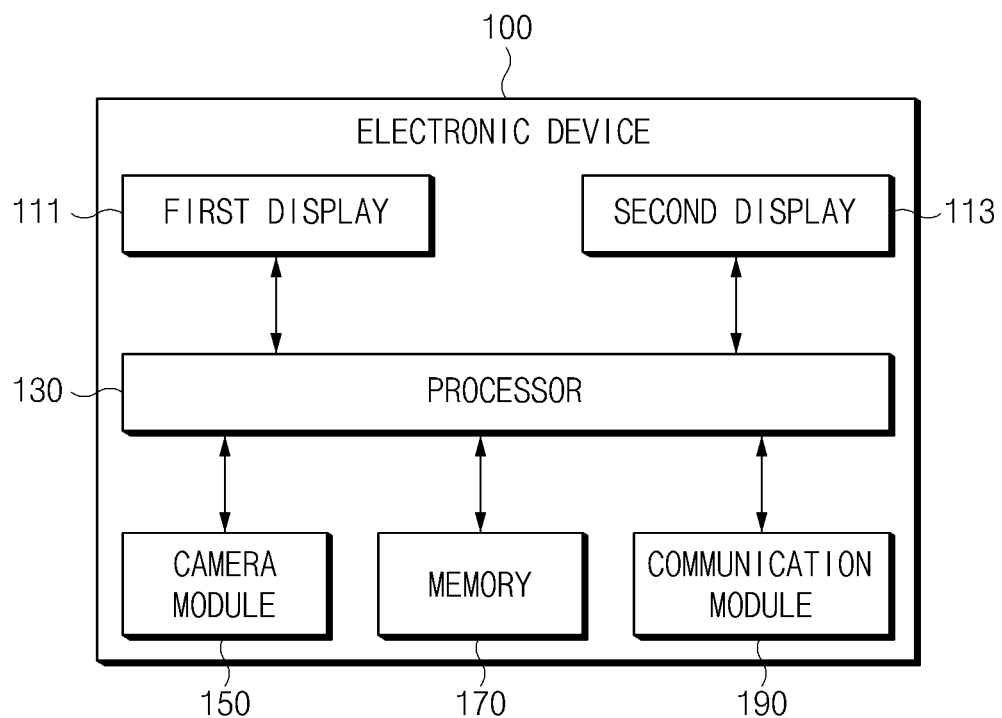
FIG. 1 illustrates an electronic device associated with image processing, according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 illustrates an electronic device associated with image processing, according to an embodiment.

An electronic device 100 including a plurality of displays may output different screens to displays, respectively. For example, the electronic device 100 may display execution screens of different applications on the displays, respectively; or the electronic device 100 may display different function execution screens of the same application on the displays, respectively. In the case where the execution screens of different applications respectively output on the displays or different function execution screens of the same application are associated with each other by the execution of a specific function, the electronic device 100 may assign the display order of the image obtained by the execution of the specific function, so as to be adjacent to the display order of an image output in advance, thereby minimizing an operation of outputting the output image again. The display order of the image may indicate an order in which the image is output on a display in response to a specified user input. For example, when outputting images stored in a memory 170 on a display, the electronic device 100 may control the sequential output of the images depending to the display order of the images, in response to the specified user input. According to an embodiment, the display order of the images may be set based on a point in time when the images are stored in the memory 170, identifiers (e.g., a file name or the like) of the images, or the like.

Referring to FIG. 1, the electronic device 100 performing the above-described function may include a first display 111, a second display 113, a processor 130, a camera module 150, the memory 170, and a communication module 190. However, a configuration of the electronic device 100 may not be limited thereto. According to various embodiments, the electronic device 100 may omit at least one of the above-described components, or may further include at least another component. For example, the electronic device 100 may further include a third display (not illustrated).

The first display 111 and the second display 113 may display various content (e.g., texts, images, video, icons, symbols, or the like) to a user. The first display 111 or the second display 113 may include, for example, a liquid crystal display (LCD), a light-emitting diode (LED) display, an organic LED (OLED) display, a microelectromechanical systems (MEMS) display, or an electronic paper display.

Each of the first display 111 and the second display 113 may include a panel and a display driver IC (DDI) configured to control the panel. The panel may include a plurality of pixels, and each pixel may include sub-pixels that display RGB being the three primary colors of light. Each of the sub-pixels may include at least one transistor and may adjust a pixel depending on the magnitude of voltage (or flowing current), which is applied to the transistor, to express the color. The DDI may include a gate driver circuit unit that has an on/off function and controls a gate of the sub-pixel and a source driver circuit unit that adjusts an image signal of the sub-pixel to make a difference in color and may adjust the transistor of the sub-pixel to provide the whole screen. The DDI may receive image data from the processor 130 and may operate such that a video or an image is displayed on the panel.

According to various embodiments, at least one of the panels included in the first display 111 and the second display 113 may be implemented to be flat, flexible, or bendable. For another example, at least one of the panels may include one of more modules including a touch panel and/or a pen sensor.

According to various embodiments, at least one of the first display 111 and the second display 113 may include a module (e.g., a hologram device, a projector, or the like that is not illustrated) that supports another image output method and/or a control circuit for controlling the module.

In embodiments implementing the electronic device 100 including a plurality of displays, at least part of content (e.g., image data, image data stream, or the like) being changed in various modules and devices of the electronic device 100 may be processed by using the processor 130. The processor 130 may determine to output content being changed, on at least one of the first display 111 or the second display 113. For example, the processor 130 may allow the first display 111 to output images stored in the memory 170, and may allow the second display 113 to output an image obtained from the camera module 150 or from an external electronic device connected based on the communication module 190. In another embodiment, the processor 130 may change, extend, and display an image output on the first display 111, on the second display 113; or the processor 130 may change, extend, and display an image output on the second display 113, on the first display 111.

The processor 130 may include one or more of a central processing unit (CPU), an application processor (AP), or a communication processor (CP). The processor 130 may perform, for example, data processing or an operation associated with control or communication of at least one other component(s) of the electronic device 100. The processor 130 may drive an operating system (OS) or an application program to control a plurality of hardware or software components connected to the processor 130 and may process and compute a variety of data. For example, the processor 130 may be implemented with a system on chip (SoC). According to an embodiment of the present disclosure, the processor 130 may further include a graphic processing unit (GPU) and/or an image signal processor.

According to various embodiments, the processor 130 may control the output of each of the first display 111 and the second display 113. According to an embodiment, the processor 130 may allow the first display 111 and the second display 113 to output the execution screens of different applications or to output different function execution screens of the same application. For example, the processor 130 may allow the first display 111 to output images stored in the memory 170 and may allow the second display 113 to output a multimedia image. The multimedia image may include at least one of a text, an image, and a video as an image including various pieces of content. For example, the processor 130 may allow the second display 113 to output the preview image obtained from the camera module 150, or at least one of information and data (e.g., an image) exchanged with the external electronic device connected through the communication module 190.

According to various embodiments, in the case where images stored in the memory 170 is output on the first display 111, the processor 130 may change the outputs of the images in response to a specified user input. For example, when an input (e.g., a flick input) that moves the touch point of a touch object to the left or the right while the touch object (e.g., an electronic pen, a body part of a user, or the like) contacts the first display 111, the processor 130 may change an image output in advance, to another image and then may output the changed image. In this case, the processor 130 may determine an image to be output, based on the display order of images stored in the memory 170. For example, in the case where the display order of an image output in advance is the n-th order, the processor 130 may determine an image corresponding to the (n−1)-th order or the (n+1)-th order, which is the display order adjacent to the n-th order, as an image to be output in response to the flick input. However, a method of determining the image to be output is not limited thereto. According to various embodiments, when the flick input occurs, the processor 130 may determine a movement distance of a touch point of the touch object and may determine the movement step on the display order of the images in proportion to the magnitude of the moving distance. In this regard, the movement step on the display order may correspond to the number of images, which are present between the image output in advance and the image to be output. For example, in the case where the image output in advance is an image corresponding to the n-th order and the image to be output is an image corresponding to the (n−m)-th order or the (n+m)-th order, the movement step on the display order may be assigned to 'm'. According to an embodiment, as the movement distance increases, the processor 130 may determine that an image in which the movement step on the display order from the n-th order is great is the image to be output.

According to various embodiments, when the processor 130 obtains an image from the camera module 150 or from an external electronic device connected through the communication module 190 while images stored in the memory 170 are output on the first display 111, the processor 130 may store the obtained image in the memory 170. In addition, the processor 130 may assign the display order of the obtained image so as to be adjacent to the display order of the image being output on the first display 111. For example, in the case where the display order of the image being output on the first display 111 corresponds to the n-th order, the processor 130 may assign the display order of the obtained image to the (n−1)-th order or the (n+1)-th order. As described above, the display order of the obtained image may be assigned to be adjacent to the display order of the image output in advance, thereby minimizing an operation of again outputting the image output in advance even though the image output in advance is changed to the obtained image and then the obtained image is output. For example, when a flick input occurs only once while the obtained image is output on the first display 111, the processor 130 may again output the image output in advance.

According to various embodiments, the processor 130 may allow the first display 111 to output the obtained image. Alternatively, even though an image is obtained, the processor 130 may maintain the output state of the image output in advance.

According to various embodiments, when obtaining another image from the camera module 150 or from an external electronic device connected through the communication module 190, the processor 130 may store the obtained image in the memory 170 and may assign the display order of the obtained image so as to be adjacent to the display order of an image being output on the first display 111. Furthermore, the processor 130 may re-assign the display order of the image obtained previously. For example, when a second image is obtained from the camera module 150 or the external electronic device while a first image is output on the first display 111, the processor 130 may assign the display order of the second image so as to be adjacent to the display order of the first image. Moreover, the processor 130 may output the second image on the first display 111 or may maintain the output state of the first image. When a third image is obtained from the camera module 150 or the external electronic device while the first image or the second image is output, the processor 130 may assign the display order of the third image so as to be adjacent to the display order of the first image or the second image, which is being output on the first display 111. Furthermore, the processor 130 may re-assign the display order of the second image obtained previously. According to an embodiment, for example, the processor 130 may assign the display order of the second image to the highest order (e.g., the first order) or the last order (e.g., the (n+1)-th order) in the case where the number of images stored in the memory 170 is 'n', among display orders of images stored in the memory 170.

According to various embodiments, in the case where a plurality of images are obtained from the camera module 150 or the external electronic device within a specified time, the processor 130 may assign the display order of the images depending on the obtained time. For example, when the second image and the third image are sequentially obtained from the camera module 150 or the external electronic device within a specified time while a first image is output on the first display 111, the processor 130 may assign the display order of the second image so as to be adjacent to the display order of the first image and may assign the display order of the third image so as to be adjacent to the display order of the second image. For example, in the case where the display order of the first image corresponds to the n-th order, the processor 130 may assign the display order of the second image to the (n−1)-th order (or the (n+1)-th order) and may assign the display order of the third image to the (n−2)-th order (or the (n+2)-th order).

For example, the camera module 150 may capture a still image and a video. According to an embodiment, the camera module 150 may include at least one of a lens that receives image light of a subject and converts the light into an image, an aperture that adjusts the amount of light passing through the lens, a shutter that closes or opens the aperture such that an image sensor is exposed to the light passing through the lens during a specific time, the image sensor that receives the image from the lens as a light signal, and an internal memory. The internal memory may temporarily store the captured image. According to an embodiment, the internal memory may store an image captured through the image sensor, before the button is manipulated. According to various embodiments, the processor 130 may provide the image stored in the internal memory as an image such as a preview, a live view, or the like. In any embodiment, the processor 130 may store an image captured by manipulating the shutter in the internal memory, and may transfer the captured image to the memory 170 when a specified user input is received or depending on setting information.

The memory 170 may include a volatile and/or nonvolatile memory. For example, the memory 170 may store instructions or data associated with at least one other component(s) of the electronic device 100. According to an embodiment, the memory 170 may store an application supported by the electronic device 100. For example, the memory 170 may include an album application that makes it possible to output images stored in the memory 170, a camera application that supports capturing based on the camera module 150, a communication application (e.g., social network service (SNS) application) that exchanges information and data with an external electronic device connected based on the communication module 190, or the like. For another example, the memory 170 may store the obtained image from the camera module 150 and the external electronic device connected based on the communication module 190.

The communication module 190 may establish communication between the electronic device 100 and an external device. For example, the communication module 190 may be connected to a network through a wireless communication or a wired communication, thus communicating with the external electronic device.

The wireless communication may include at least one of, for example, LTE (long-term evolution), LTE-A (LTE Advanced), CDMA (Code Division Multiple Access), WCDMA (Wideband CDMA), UMTS (Universal Mobile Telecommunications System), WiBro (Wireless Broadband), or GSM (Global System for Mobile Communications), or the like, as cellular communication protocol. In addition, the wireless communication may include, for example, the short range communication. The short range communication may include at least one of wireless fidelity (Wi-Fi), Bluetooth, near field communication (NFC), magnetic stripe transmission (MST), global navigation satellite system (GNSS), or the like. The GNSS may include at least one of a global positioning system (GPS), a global navigation satellite system (Glonass), a Beidou Navigation Satellite System (hereinafter referred to as "Beidou"), or a European global satellite-based navigation system (Galileo). Hereinafter, "GPS" and "GNSS" may be used interchangeably in the present disclosure.

The wired communication may include at least one of, for example, a universal serial bus (USB), a high definition multimedia interface (HDMI), a recommended standard 232 (RS-232), a plain old telephone service (POTS), or the like. For example, the network may include at least one of telecommunications network, for example, a computer network (e.g., local area network (LAN) or wide area network (WAN)), Internet, or a telephone network.

According to various embodiments, the electronic device 100 may obtain an image from the external electronic device connected through the communication module 190. Furthermore, the electronic device 100 may transmit an image to the external electronic device connected through the communication module 190.

As described above, an electronic device (e.g., the electronic device 100) may include a plurality of displays (e.g., the first display 111 and the second display 113), a memory (e.g., the memory 170) storing at least one image, and a processor (e.g., the processor 130) operatively connected to the displays and the memory. The processor may be configured to output a first image of images stored in the memory, on a first display (e.g., the first display 111) among the displays, to output a multimedia image on a second display (e.g., the second display 113) among the displays, and to assign a display order of the second image so as to be adjacent to a display order of the first image when a second image is obtained.

According to various embodiments, the processor may be configured to store the second image in the memory.

According to various embodiments, the processor may be configured to output the second image to the first display.

According to various embodiments, the electronic device may further include a camera module for capturing. The multimedia image may include a preview image obtained from the camera module.

According to various embodiments, the second image may include a captured image obtained from the camera module in response to a capture input.

According to various embodiments, the electronic device may further include a communication module communicating with an external electronic device. The multimedia image may include at least one of information and data, which are exchanged with the external electronic device.

According to various embodiments, the second image may include the data obtained from the external electronic device in response to an input in which a function button for receiving the data is selected.

According to various embodiments, the processor may be configured to assign a display order of the third image so as to be adjacent to a display order of an image being output on the first display, when a third image is obtained.

According to various embodiments, the processor may be configured to re-assign the display order of the second image to a first order or a last order among display orders of the images stored in the memory.

According to various embodiments, the processor may be configured to assign the display order of the third image so as to be adjacent to the display order of the second image, when the third image is obtained within a specified time after the second image is obtained.

Figure 2:
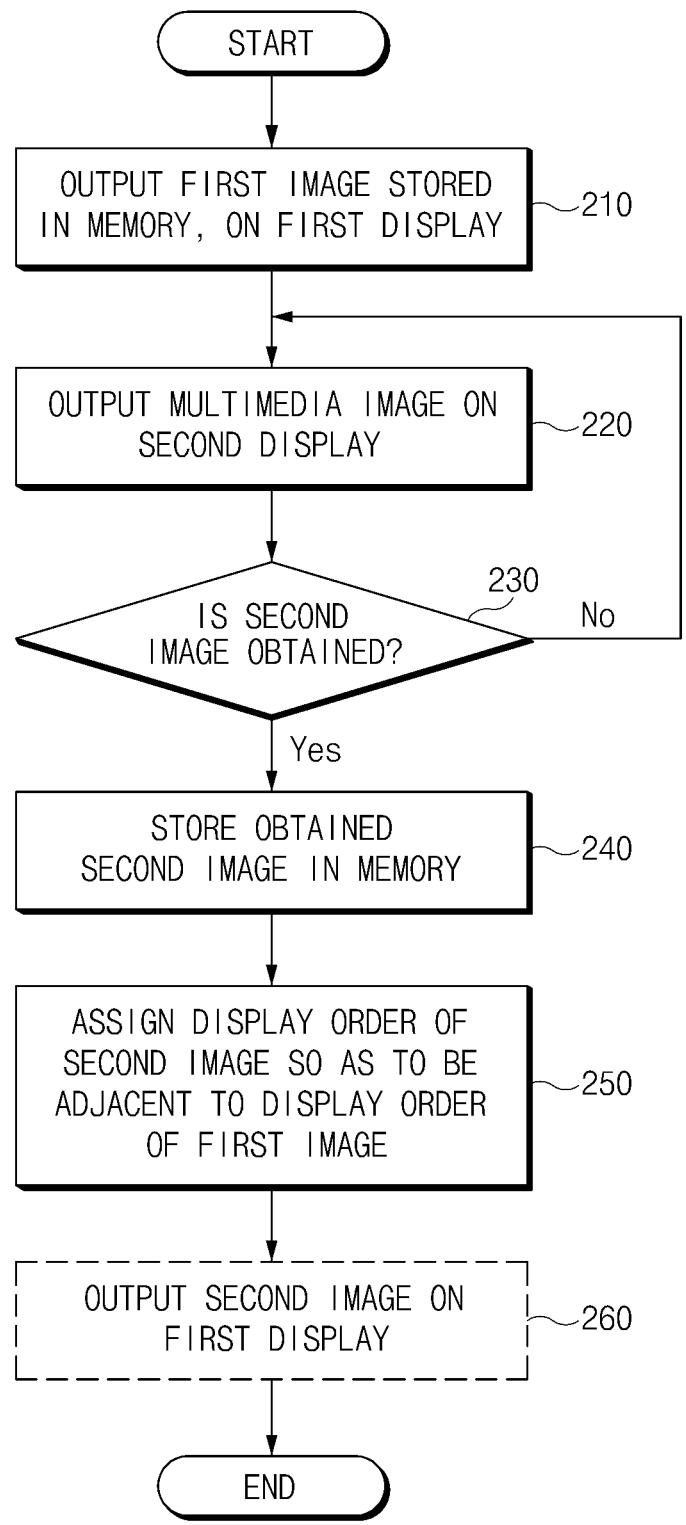
FIG. 2 illustrates an operating method of an electronic device associated with image processing, according to an embodiment.

FIG. 2 illustrates an operating method of an electronic device associated with image processing, according to an embodiment.

Referring to FIG. 2, in operation 210, an electronic device (e.g., the electronic device 100) may output a first image stored in a memory (e.g., the memory 170), on a first display (e.g., the first display 111). According to an embodiment, the electronic device may output an image corresponding to the first order among the display orders of images stored in the memory. For another example, when a specified user input (e.g., a flick input) to the first display occurs, the electronic device may change an image output in advance to another image stored in the memory and output the another image. In this case, the electronic device may determine an image to be output, based on the display order of images stored in the memory.

In operation 220, the electronic device may output a multimedia image on a second display (e.g., the second display 113). According to an embodiment, the electronic device may output a preview image obtained from a camera module (e.g., the camera module 150), on the second display. Alternatively, the electronic device may output at least one of information and data (e.g., an image), which are exchanged with an external electronic device connected through a communication module (e.g., the communication module 190).

In operation 230, the electronic device may determine whether a second image is obtained from the camera module or the external electronic device. According to an embodiment, the electronic device may determine whether a capture input occurs in a state where the preview image obtained from the camera module is output on the second display. For example, the electronic device may determine whether a shutter manipulation input or an input to select a function button configured to perform a capture function occurs. For another example, while outputting information and data (e.g., an image), which are exchanged with an external electronic device connected through the communication module, on the second display, the electronic device may determine whether the input to select a function button configured to receive the data occurs.

According to various embodiments, the electronic device may perform operation 220 when not obtaining the second image. For example, the electronic device may output a multimedia image on the second display. For example, the electronic device may output a preview image obtained from the camera module on the second display. Alternatively, the electronic device may output at least one of information and data, which are exchanged with the external electronic device, on the second display.

According to various embodiments, when obtaining the second image, in operation 240, the electronic device may store the second image in the memory. According to an embodiment, when the capture input occurs, the electronic device may obtain an image captured from the camera module and may store the captured image in the memory. For another example, when the function button configured to receive the data is selected, the electronic device may obtain the data from the external electronic device and may store the data in the memory.

In operation 250, the electronic device may assign the display order of the second image so as to be adjacent to the display order of the first image, which is being output on the first display. According to an embodiment, in the case where the display order of the first image corresponds to the n-th order, the electronic device may assign the display order of the second image to the (n−1)-th order or the (n+1)-th order.

According to various embodiments, in operation 260, the electronic device may output the second image on the first display. According to an embodiment, the electronic device may output the captured image obtained from the camera module, on the first display. For another example, the electronic device may output data (e.g., an image) obtained from the external electronic device, on the first display.

According to various embodiments, the electronic device may skip the execution of operation 260. For example, the electronic device may maintain the output state of the first image. For another example, after outputting the second image on the first display during a specified time, the electronic device may terminate the output of the second image and may output the first image again.

According to various embodiments, until an application that makes it possible to output images stored in the memory is terminated, the electronic device may repeatedly perform above-described operation 210 to operation 260. Furthermore, when obtaining a third image from the camera module or the external electronic device after obtaining the second image, the electronic device may store the third image in the memory. Moreover, the electronic device may assign the display order of the third image so as to be adjacent to the display order of the first image (or the second image) being output on the first display. According to various embodiments, when obtaining the third image, the electronic device may assign the display order of the second image again. For example, the electronic device may assign the display order of the second image to the first order or the last order among display orders of images stored in the memory.

According to various embodiments, when obtaining the third image within a specified time after obtaining the second image, the electronic device may assign the display order of the third image so as to be adjacent to the display order of the second image. For example, in the case where the display order of the first image corresponds to the n-th order and the display order of the second image corresponds to the (n−1)-th order (or the (n+1)-th order), the electronic device may assign the display order of the third image to the (n−2)-th order (or the (n+2)-th order).

As described above, according to various embodiments, an image processing method of an electronic device including a plurality of displays may include outputting a first image of images stored in a memory, on a first display, outputting a multimedia image on a second display, obtaining a second image, and assigning a display order of the second image so as to be adjacent to a display order of the first image.

According to various embodiments, the image processing method may further include storing the second image in the memory.

According to various embodiments, the image processing method may further include outputting the second image on the first display.

According to various embodiments, the outputting of the multimedia image may include outputting a preview image obtained from a camera module for capturing.

According to various embodiments, the obtaining of the second image may include obtaining a captured image obtained from the camera module as the second image in response to a capture input.

According to various embodiments, the outputting of the multimedia image may include outputting at least one of information and data, which are exchanged with an external electronic device connected through a communication module.

According to various embodiments, the obtaining of the second image may include obtaining the data obtained from the external electronic device, as the second image in response to an input in which a function button configured to receive the data is selected.

According to various embodiments, the image processing method may further include obtaining a third image and assigning a display order of the third image so as to be adjacent to a display order of an image being output on the first display.

According to various embodiments, the image processing method may further include re-assigning the display order of the second image to a first order or a last order among display orders of the images stored in the memory.

According to various embodiments, the image processing method may further include assigning the display order of the third image so as to be adjacent to the display order of the second image when the third image is obtained within a specified time after the second image is obtained.

Figure 3:
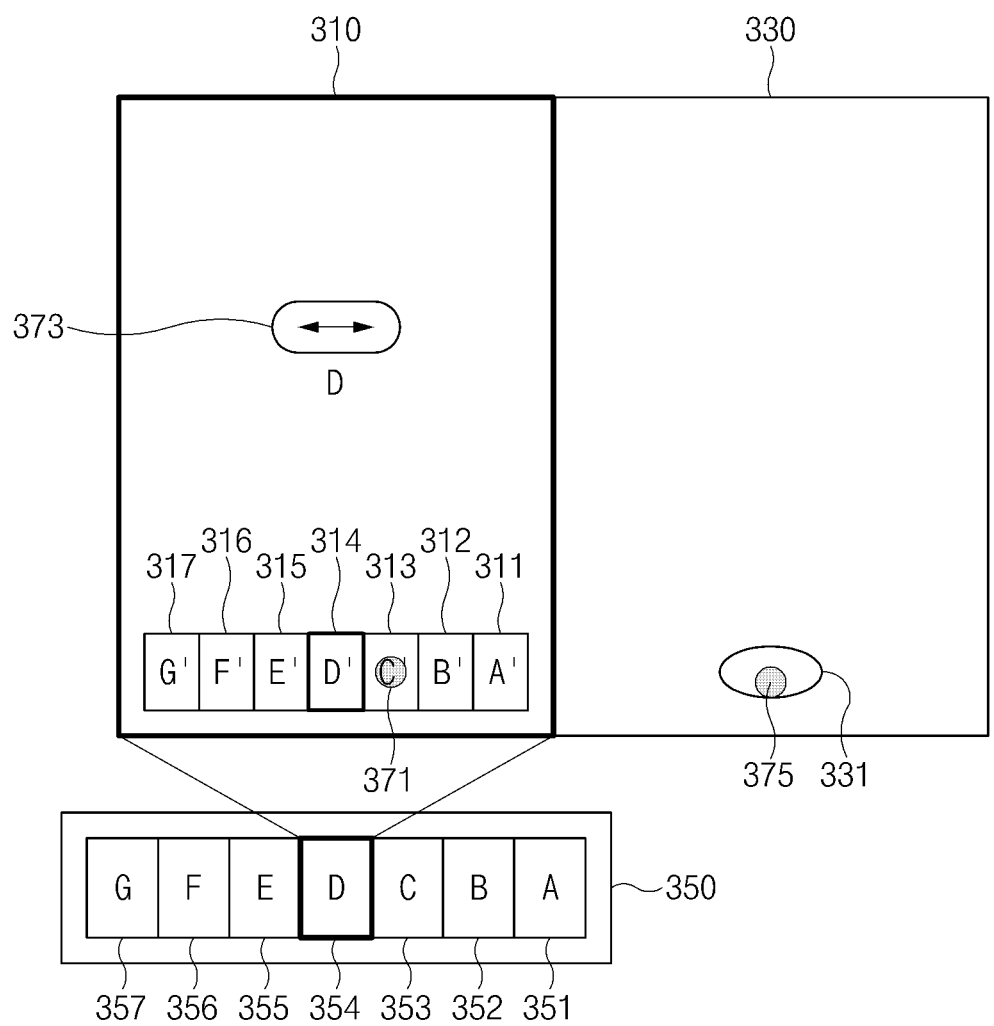
FIG. 3 is a view for describing a screen output onto a plurality of displays, according to an embodiment.

FIG. 3 is a view for describing a screen output on a plurality of displays, according to an embodiment.

Referring to FIG. 3, an electronic device (e.g., the electronic device 100) may include a plurality of displays. The drawing illustrates a state where the electronic device includes a first display 310 and a second display 330.

According to various embodiments, the electronic device may output images stored in a memory 350, on the first display 310. For example, the electronic device may output the execution screen of an album application, which makes it possible to output images stored in the memory 350, on the first display 310.

According to various embodiments, the electronic device may determine an image to be output on the first display 310, based on the display order of images stored in the memory 350. For example, in the case where a first image 351 corresponding to the first order, a second image 352 corresponding to the second order, a third image 353 corresponding to the third order, a fourth image 354 corresponding to the fourth order, a fifth image 355 corresponding to the fifth order, a sixth image 356 corresponding to the sixth order, and a seventh image 357 corresponding to the seventh order are stored in the memory 350, the electronic device may sequentially output the first image 351, the second image 352, the third image 353, the fourth image 354, the fifth image 355, the sixth image 356, and the seventh image 357, on the first display 310 from the first image 351 corresponding to the first order. For example, when the album application is executed, the electronic device may output the first image 351 corresponding to the first order, on the first display 310. However, embodiments of the present disclosure are not limited thereto. According to various embodiments, when the album application is executed, the electronic device may output the seventh image 357 corresponding to the last order, on the first display 310. In any embodiment, when the album application is executed again, the electronic device may output the image output immediately before the album application is terminated, on the first display 310.

According to various embodiments, the electronic device may output simplified images (e.g., thumbnail images) corresponding to images stored in the memory 350, in a specific area (e.g., a lower end area) of the first display 310. For example, the electronic device may output at least one of a first thumbnail image 311 corresponding to the first image 351, a second thumbnail image 312 corresponding to the second image 352, a third thumbnail image 313 corresponding to the third image 353, a fourth thumbnail image 314 corresponding to the fourth image 354, a fifth thumbnail image 315 corresponding to the fifth image 355, a sixth thumbnail image 316 corresponding to the sixth image 356, and a seventh thumbnail image 317 corresponding to the seventh image 357, in the specific area of the first display 310. According to various embodiments, the electronic device may apply a highlight effect to a thumbnail image corresponding to an image, which is being output on the first display 310, from among images stored in the memory 350. For example, the electronic device may highlight the thumbnail image by differently outputting the background color, the border color, the border thickness, or the like of the thumbnail image. The drawing illustrates a state where the electronic device highlights the fourth thumbnail image 314 by thickly outputting the border of the fourth thumbnail image 314 corresponding to the fourth image 354 being output on the first display 310.

According to various embodiments, the electronic device may change an image output on the first display 310, in response to a specified user input. According to an embodiment, when a flick input 373 occurs, the electronic device may change an image output on the first display 310. For example, when the flick input 373 occurs, the electronic device may output an image corresponding to the display order adjacent to the display order of an image being output on the first display 310. For example, when the flick input 373 in the right direction occurs while the electronic device outputs the fourth image 354, the electronic device may terminate the output of the fourth image 354 and may output the fifth image 355. Alternatively, when the flick input 373 in the left direction occurs while the electronic device outputs the fourth image 354, the electronic device may terminate the output of the fourth image 354 and may output the third image 353. According to another embodiment, when an input 371 to select a thumbnail image occurs, the electronic device may output an image corresponding to the selected thumbnail image. For example, when the input 371 to select the third thumbnail image 313 occurs while the electronic device outputs the fourth image 354, the electronic device may terminate the output of the fourth image 354 and may output the third image 353 corresponding to the third thumbnail image 313.

According to various embodiments, the electronic device may output a multimedia image on the second display 330. According to an embodiment, the electronic device may output a preview image obtained from a camera module (e.g., the camera module 150) or at least one of information and data (e.g., an image), which are exchanged with an external electronic device connected through a communication module (e.g., the communication module 190), on the second display 330. For example, the electronic device may output the execution screen of a camera application or the execution screen of a communication application, on the second display 330.

According to various embodiments, the electronic device may output a function button 331 in a specific area (e.g., a lower end area) of the second display 330. For example, when outputting a preview image obtained from the camera module on the second display 330, the electronic device may output the function button 331 (e.g., a capture button) configured to perform a capture function, in a specific area of the second display 330. For another example, in the case where the electronic device outputs information and data, which are exchanged with the external electronic device, on the second display 330, the electronic device may output the function button 331 (e.g., a storage button) configured to receive the data in the specific area of the second display 330. In any embodiment, the electronic device may include the function button 331 in a menu (e.g., a pop-up menu) and may output the function button 331.

According to various embodiments, when an input 375 to select the function button 331 occurs, the electronic device may obtain an image from the camera module or the external electronic device. For example, when the capture button is selected, the electronic device may obtain the image captured from the camera module. For another example, when a storage button is selected, the electronic device may obtain the data from the external electronic device.

Figure 4:
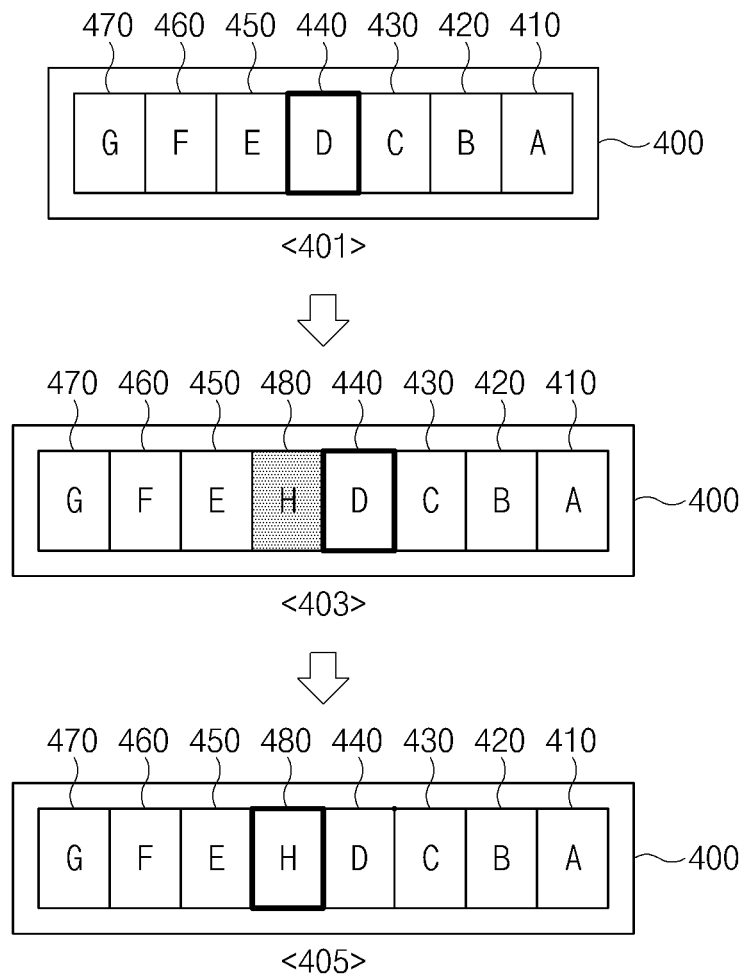
FIG. 4 is a view for describing a display order of images stored in a memory, according to an embodiment.

FIG. 4 is a view for describing a display order of images stored in a memory, according to an embodiment.

Referring to FIG. 4, a memory 400 may store images. As illustrated in a first state 401, the memory 400 may store a first image 410, the display order of which corresponds to the first order, a second image 420, the display order of which corresponds to the second order, a third image 430, the display order of which corresponds to the third order, a fourth image 440, the display order of which corresponds to the fourth order, a fifth image 450, the display order of which corresponds to the fifth order, a sixth image 460, the display order of which corresponds to the sixth order, and a seventh image 470, the display order of which corresponds to the seventh order. According to various embodiments, the images may include a captured image obtained from a camera module (e.g., the camera module 150), data obtained from an external electronic device connected through communication module (e.g., the communication module 190), or the like. However, embodiments of the present disclosure are not limited thereto. In any embodiment, the images may include an image (e.g., a snapshot image) obtained while an application included in the electronic device is executed.

According to various embodiments, when an image (e.g., an eighth image 480) is obtained from the camera module or from the external electronic device, the memory 400 may store the obtained image. According to an embodiment, the memory 400 may store the obtained image so as to be adjacent to an image (e.g., the fourth image 440) being output on a display (e.g., the first display 111). However, the storage location of the obtained image is not limited thereto. According to various embodiments, the storage location of the obtained image may be changed depending on the storage space of the memory 400. The second state 403 and the third state 405 illustrates a state where the obtained image is stored to be adjacent to an image being output on the display. However, this is to make it easier to understand the display order of stored images.

According to various embodiments, when the eighth image 480 is stored in the memory 400, a processor (e.g., the processor 130) may assign the display location of the eighth image 480 so as to be adjacent to the display location of the fourth image 440 being output on the display. The drawing illustrates a state where the display order of the eighth image 480 is assigned to the fifth order so as to be adjacent to the display order of the fourth image 440. When the display order of the eighth image 480 is assigned to the fifth order, the display order of the fifth image 450 corresponding to the previous fifth order may be changed to the sixth order, the display order of the sixth image 460 corresponding to the previous sixth order may be changed to the seventh order, and the display order of the seventh image 470 corresponding to the previous seventh order may be changed to the eighth order.

According to various embodiments, the processor may output the obtained image on the display. Alternatively, the processor may maintain the output state of an image that is output in advance on the display.

Figure 5:
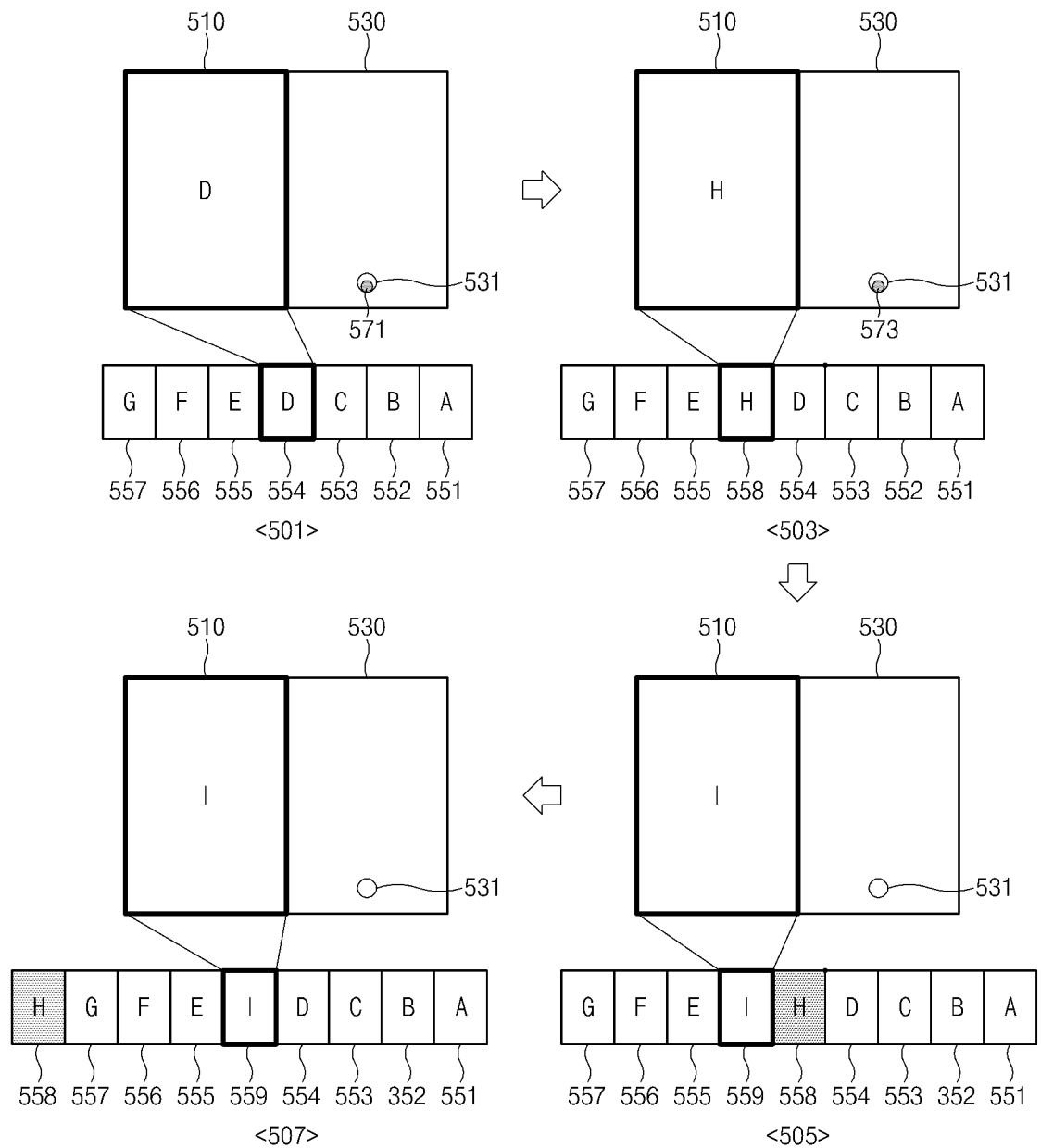
FIG. 5 is a view for describing a method of assigning a display order of the obtained image, according to an embodiment.

FIG. 5 is a view for describing a method of assigning a display order of the obtained image, according to an embodiment.

Referring to FIG. 5, as illustrated in a first state 501, an electronic device (e.g., the electronic device 100) may output images stored in a memory (e.g., the memory 170), on a first display 510. According to an embodiment, the electronic device may output at least one of images stored in the memory, on the first display 510. The drawing illustrates a state where the electronic device outputs a fourth image 554 among a first image 551, the display order of which corresponds to the first order, a second image 552, the display order of which corresponds to the second order, a third image 553, the display order of which corresponds to the third order, the fourth image 554, the display order of which corresponds to the fourth order, a fifth image 555, the display order of which corresponds to the fifth order, a sixth image 556, the display order of which corresponds to the sixth order, and a seventh image 557, the display order of which corresponds to the seventh order. Furthermore, the electronic device may output a multimedia image together with a function button 531 on a second display 530.

According to various embodiments, when an input 571 to select the function button 531 occurs, the electronic device may obtain an image (e.g., an eighth image 558) from a camera module (e.g., the camera module 150) or from an external electronic device connected through a communication module (e.g., the communication module 190). In addition, the electronic device may store the obtained image in the memory.

According to various embodiments, as illustrated in a second state 503, the electronic device may assign the display order of the obtained image so as to be adjacent to the display order of an image being output on the first display 510. The drawing illustrates a state where the electronic device assigns the display order of the obtained eighth image 558 so as to be adjacent to the display order of the fourth image 554 being output on the first display 510. For example, the electronic device may assign the display order of the eighth image 558 to the fifth order adjacent to the fourth order corresponding to the display order of the fourth image 554. In this case, the electronic device may change the display order of the fifth image 555 corresponding to the previous fifth order to the sixth order, may change the display order of the sixth image 556 corresponding to the previous sixth order to the seventh order, and may change the display order of the seventh image 557 corresponding to the previous seventh order to the eighth order. Moreover, the electronic device may output the obtained eighth image 558 on the first display 510.

According to various embodiments, when an input 573 to select the function button 531 occurs in a second state 503, the electronic device may obtain another image (e.g., a ninth image 559) from the camera module or the external electronic device. Also, the electronic device may store the obtained ninth image 559 in the memory.

According to various embodiments, even when obtaining the ninth image 559 different from the eighth image 558 obtained previously, as illustrated in a third state 505, the electronic device may assign the display order of the ninth image 559 so as to be adjacent to the display order of an image being output on the first display 510. The drawing illustrates a state where the electronic device assigns the display order of the ninth image 559 so as to be adjacent to the display order of the eighth image 558 being output on the first display 510. For example, the electronic device may assign the display order of the ninth image 559 to the sixth order adjacent to the fifth order corresponding to the display order of the eighth image 558. In this case, the electronic device may change the display order of the fifth image 555 corresponding to the previous sixth order to the seventh order, may change the display order of the sixth image 556 corresponding to the previous seventh order to the eighth order, and may change the display order of the seventh image 557 corresponding to the previous eighth order to the ninth order. Moreover, the electronic device may output the obtained ninth image 559 on the first display 510.

According to various embodiments, when obtaining the ninth image 559 different from the eighth image 558 obtained previously, as illustrated in a fourth state 507, the electronic device may assign the display order of the eighth image 558 again. According to an embodiment, the electronic device may again assign the display order of the eighth image 558 to the highest order (e.g., the first order) or the last order (e.g., the ninth order) among display orders of images stored in the memory. The drawing illustrates a state where the electronic device assigns the display order of the eighth image 558 to the ninth order again. In this case, the electronic device may change the display order of the ninth image 559 corresponding to the previous sixth order to the fifth order, may change the display order of the fifth image 555 corresponding to the previous seventh order to the sixth order, may change the display order of the sixth image 556 corresponding to the previous eighth order to the seventh order, and may change the display order of the seventh image 557 corresponding to the previous ninth order to the eighth order.

Figure 6:
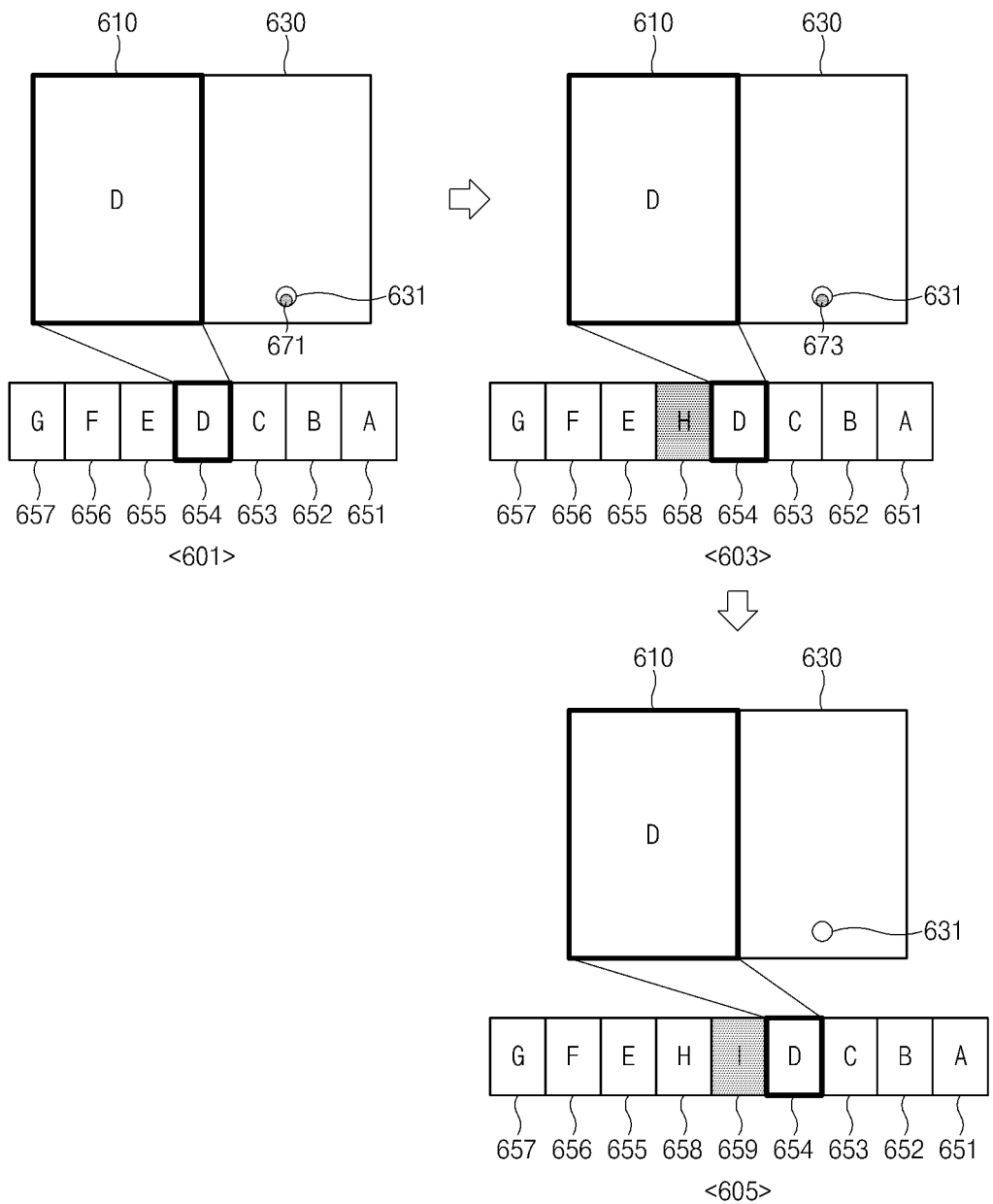
FIG. 6 is a view for describing another method of assigning a display order of the obtained image, according to an embodiment.

FIG. 6 is a view for describing another method of assigning a display order of the obtained image, according to an embodiment.

Referring to FIG. 6, as illustrated in a first state 601, an electronic device (e.g., the electronic device 100) may output images stored in a memory (e.g., the memory 170), on a first display 610. According to an embodiment, the electronic device may output at least one of images stored in the memory, on the first display 610. The drawing illustrates a state where the electronic device outputs a fourth image 654 among a first image 651, a second image 652, a third image 653, the fourth image 654, a fifth image 655, a sixth image 656, and a seventh image 657, which are stored in the memory. Furthermore, the electronic device may output a multimedia image together with a function button 631 on a second display 630.

According to various embodiments, when an input 671 to select the function button 631 occurs, the electronic device may obtain an image (e.g., an eighth image 658) from a camera module (e.g., the camera module 150) or from an external electronic device connected through a communication module (e.g., the communication module 190). In addition, the electronic device may store the obtained image in the memory.

According to various embodiments, as illustrated in a second state 603, the electronic device may assign the display order of the obtained image so as to be adjacent to the display order of an image being output on the first display 610. The drawing illustrates a state where the electronic device assigns the display order of the obtained eighth image 658 so as to be adjacent to the display order of the fourth image 654 being output on the first display 610.

Furthermore, the electronic device may maintain the output state of the fourth image 654 output on the first display 610.

According to various embodiments, when an input 673 to select the function button 631 occurs in a second state 603, the electronic device may obtain another image (e.g., a ninth image 659) from the camera module or the external electronic device. Also, the electronic device may store the obtained ninth image 659 in the memory and may assign the display order of the ninth image 659 so as to be adjacent to the display order of the fourth image 654 being output on the first display 610. In this case, the display order of an image in which the previous display order overlaps with the display order of the ninth image 659 may be changed, and the display order of another image may be also changed depending on the change of the display order.

Figure 7:
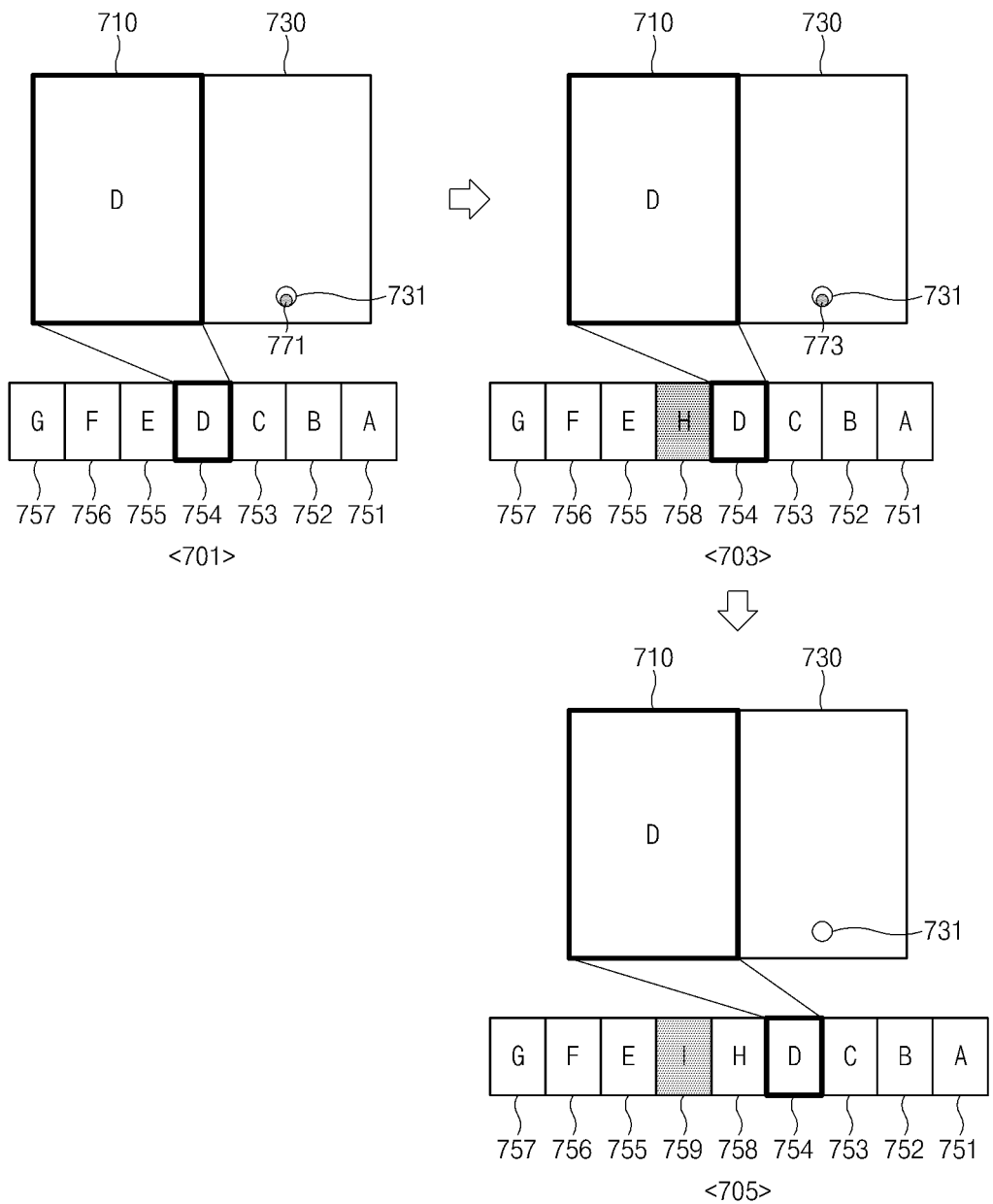
FIG. 7 is a view for describing another method of assigning a display order of the obtained image, according to an embodiment.

FIG. 7 is a view for describing another method of assigning a display order of the obtained image, according to an embodiment.

Referring to FIG. 7, as illustrated in a first state 701, an electronic device (e.g., the electronic device 100) may output images stored in a memory (e.g., the memory 170), on a first display 710. According to an embodiment, the electronic device may output at least one of images stored in the memory, on the first display 710. The drawing illustrates a state where the electronic device outputs a fourth image 754 among a first image 751, the display order of which corresponds to the first order, a second image 752, the display order of which corresponds to the second order, a third image 753, the display order of which corresponds to the third order, the fourth image 754, the display order of which corresponds to the fourth order, a fifth image 755, the display order of which corresponds to the fifth order, a sixth image 756, the display order of which corresponds to the sixth order, and a seventh image 757, the display order of which corresponds to the seventh order. Furthermore, the electronic device may output a multimedia image together with a function button 731 on a second display 730.

According to various embodiments, when an input 771 to select the function button 731 occurs, the electronic device may obtain an image (e.g., an eighth image 758) from a camera module (e.g., the camera module 150) or from an external electronic device connected through a communication module (e.g., the communication module 190). In addition, the electronic device may store the obtained image in the memory.

According to various embodiments, as illustrated in a second state 703, the electronic device may assign the display order of the obtained image so as to be adjacent to the display order of an image being output on the first display 710. The drawing illustrates a state where the electronic device assigns the display order of the obtained eighth image 758 so as to be adjacent to the display order of the fourth image 754 being output on the first display 710. For example, the electronic device may assign the display order of the eighth image 758 to the fifth order adjacent to the fourth order corresponding to the display order of the fourth image 754. In this case, the electronic device may change the display order of the fifth image 755 corresponding to the previous fifth order to the sixth order, may change the display order of the sixth image 756 corresponding to the previous sixth order to the seventh order, and may change the display order of the seventh image 757 corresponding to the previous seventh order to the eighth order. Furthermore, the electronic device may maintain the output state of the fourth image 754 output on the first display 710.

According to various embodiments, when an input 773 to select the function button 731 occurs in a second state 703 within a specified time, the electronic device may obtain another image (e.g., a ninth image 759) from the camera module or the external electronic device. Also, the electronic device may store the obtained ninth image 759 in the memory.

According to various embodiments, in the case where the electronic device obtains a plurality of images within a specified time (e.g., in the case where a continuous capturing function is performed), the electronic device may assign the display order of the obtained images depending on the capturing time. According to an embodiment, in the case where the electronic device obtains the ninth image 759 within a specified time after obtaining the eighth image 758, as illustrated in a third state 705, the electronic device may assign the display order of the ninth image 759 so as to be adjacent to the display order of the eighth image 758. For example, the electronic device may assign the display order of the ninth image 759 to the sixth order adjacent to the fifth order corresponding to the display order of the eighth image 758. In this case, the electronic device may change the display order of the fifth image 755 corresponding to the previous sixth order to the seventh order, may change the display order of the sixth image 756 corresponding to the previous seventh order to the eighth order, and may change the display order of the seventh image 757 corresponding to the previous eighth order to the ninth order. Furthermore, the electronic device may maintain the output state of the fourth image 754 output on the first display 710.

According to an embodiment, when the electronic device obtains a plurality of images within a specified time, the electronic device may output the images on the first display 710 depending on the display order of images at predetermined intervals. For example, the electronic device may output a plurality of images obtained within a specified time, on the first display 710 in a slide format. In this case, when a specified time elapses after the electronic device outputs an image, which has the display order being a high priority, from among the plurality of images on the first display 710, the electronic device may terminate the output of the image having the display order, which is the high priority, and may output the image having the display order, which is a low priority, on the first display 710. When the electronic device outputs the plurality of images in the above manner, the electronic device may maintain the output state of the last output image among the plurality of images, or may again output the image that has been output immediately before outputting the plurality of images.

According to an embodiment, when obtaining a new image through the camera module or the communication module, the electronic device may change the display states of simplified images (e.g., a thumbnail image) output in the specific area of the first display 710. For example, the electronic device may generate the simplified image corresponding to the new image and may include the simplified image in simplified images output in advance. In this case, in the case where the number of simplified images exceeds the specified number, the electronic device may replace one of the simplified images output in advance, with a newly generated simplified image. Herein, the display locations of the simplified images may be determined based on the display order of the images corresponding to the simplified images.

According to an embodiment, the image obtained through the camera module or the communication module may be at least part of a multimedia image output on the second display 730. For example, the obtained image may be a part of the preview image of the camera module output on the second display 730. For example, when the function button 731 (e.g., a capture button) is selected while the preview image obtained from the camera module is output on the second display 730 an image output at a point in time when the function button 731 is selected may be obtained from preview images as the obtained image.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 130), may cause the one or more processors to perform a function corresponding to the instruction. The computer-readable storage media, for example, may be the memory 170.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a plurality of displays;
a memory configured to store a plurality of images; and
a processor operatively connected to the displays and the memory,
wherein the processor is configured to:
output a first image of the plurality of images stored in the memory, on a first display among the displays, wherein the first image, a display order of which corresponds to the (n)th order, is followed by a subsequent image, a display order of which corresponds to the (n+1)th order, in a display order for the plurality of images;
output a multimedia image on a second display among the displays; and
when a second image is obtained, automatically assign a display order of the second image to be the (n+1)th order and change the display order of the subsequent image from the (n+1)th order to the (n+2)th order,
wherein the second image is between the first image and the subsequent image in the display order of the plurality of images.

2. The electronic device of claim 1, wherein the processor is configured to: store the second image in the memory.

3. The electronic device of claim 1, wherein the processor is configured to: output the second image to the first display.

4. The electronic device of claim 1, further comprising:
a camera module for capturing,
wherein the multimedia image includes a preview image obtained from the camera module.

5. The electronic device of claim 4, wherein the second image includes a captured image obtained from the camera module in response to a capture input.

6. The electronic device of claim 1, further comprising:
a communication module configured to communicate with an external electronic device,
wherein the multimedia image includes at least one of information and data, which are exchanged with the external electronic device.

7. The electronic device of claim 6, wherein the second image includes the data obtained from the external electronic device in response to an input in which a function button configured to receive the data is selected.

8. The electronic device of claim 1, wherein the processor is configured to:
when a third image is obtained, including the third image in the plurality of images,
wherein the third image is adjacent to the second image in the display order of the plurality of images.

9. The electronic device of claim 8, wherein the processor is configured to:
re-assign the second image to a first order or a last order in the display order of the plurality of images.

10. The electronic device of claim 8, wherein the processor is configured to:
when the third image is obtained within a specified time after the second image is obtained, the third image is between the second image and the subsequent image.

11. An image processing method of an electronic device including a plurality of displays, the method comprising:
outputting a first image of a plurality of images stored in a memory, on a first display, wherein the first image, a display order of which corresponds to the (n)th order, is followed by a subsequent image, a display order of which corresponds to the (n+1)th order, in a display order for the plurality of images;
outputting a multimedia image on a second display; and
obtaining a second image, automatically assigning a display order of the second image to be the (n+1)th order, and changing the display order of the subsequent image from the (n+1)th order to the (n+2)th order,
wherein the second image is between the first image and the subsequent image in the display order of the plurality of images.

12. The method of claim 11, further comprising:
storing the second image in the memory.

13. The method of claim 11, further comprising:
outputting the second image on the first display.

14. The method of claim 11, wherein the outputting of the multimedia image includes outputting a preview image obtained from a camera module for capturing.

15. The method of claim 14, wherein the obtaining of the second image includes obtaining a captured image obtained from the camera module as the second image in response to a capture input.

16. The method of claim 11, wherein the outputting of the multimedia image includes outputting at least one of information and data, which are exchanged with an external electronic device connected through a communication module.

17. The method of claim 16, wherein the obtaining of the second image includes obtaining the data obtained from the external electronic device, as the second image in response to an input in which a function button configured to receive the data is selected.

18. The method of claim 11, further comprising:
obtaining a third image and including the third image in the plurality of images; and
wherein the third image is adjacent to the second image in the display order of the plurality of images.

19. The method of claim 18, further comprising:
re-assigning the second image to a first order or a last order in the display order of the plurality of images stored.

20. The method of claim 18, further comprising:
when the third image is obtained within a specified time after the second image is obtained, the third image is between the second image and the subsequent image.

21. The electronic device of claim 1, wherein when the second image is obtained, replacing the first image with the second image on the first display.

* * * * *